United States Patent Office 3,377,392
Patented Apr. 9, 1968

3,377,392
PROCESS FOR PREPARING 1,1,1,2,2-PENTAFLUO-RO - 3 - CHLOROPROPANE AND 1,1,1,2,2 - PENTAFLUORO-3-BROMOPROPANE
Max M. Boudakian, Hamden, New Haven, Conn., assignor to E. R. Squibb & Sons, Inc., New York, N.Y., a corporation of Delaware
No Drawing. Filed Feb. 18, 1966, Ser. No. 528,356
3 Claims. (Cl. 260—653)

ABSTRACT OF THE DISCLOSURE $CF_3CF_2CH_2X$, wherein X is chlorine or bromine, is prepared by treating a compound of the formula $$CFXYCF_2CH_2X,$$

wherein X is chlorine or bromine and Y is any halogen, with a disproportionate catalyst.

---

This invention relates to a new process for preparing the compounds: $CF_3CF_2CH_2Cl$ and $CF_3CF_2CH_2Br$.

The process of this invention in its broadest aspects entails treating a compound of the formula $$CFXYCF_2CH_2X$$

wherein X is chlorine or bromine, and Y is any halogen, with a disproportionation catalyst to yield a compound of the formula $CF_3CF_2CH_2X$, wherein X is as hereinbefore defined.

Among the suitable catalyst may be mentioned aluminum bromide, aluminum fluoride, boron trifluoride or its etherate, ferric chloride, ferric bromide, antimony trichloride, antimony pentachloride, tin tetrachloride, titanium tetrachloride, zinc chloride, and preferably aluminum chloride. The catalyst can be present in any amount and preferably is present in a concentration in the range of about 0.01 to about 25 percent by weight, and optimally about 1 to about 10 percent by weight.

The reaction can be carried out at any normal temperature, and temperatures in the range of about −20° C., to about 450° C. are utilizable. Preferably the temperature is in the range of about 0° C. to about 100° C. Under these conditions the desired reaction is achieved in a reaction time of about 1 minute to about 24 hours.

Among the suitable halogenated hydrocarbon reactants can be mentioned: $Cl_2CFCF_2CH_2Cl$; $ClCF_2CF_2CH_2Cl$; $CBr_2FCF_2CH_2Br$; and $CBrF_2CF_2CH_2Br$, and mixtures thereof.

The following examples illustrate the invention (all temperatures being in centigrade):

EXAMPLE 1.—$CF_3CF_2CH_2Cl$ (a) Preparation of $ClCF_2CF_2CH_2Cl$ and $Cl_2CFCF_2CH_2Cl$ Mercuric oxide (15.1 g.; 0.07 mole), hydrogen fluoride (16.8 g.; 0.84 mole) and $CCl_3CF_2CH_2Cl$ (0.07 mole; 15.4 g.; 96.1% assay) are heated in a 150 ml. Monel cylinder for 7 hours at 95–138° (175 p.s.i.g., maximum pressure) with agitation. The residual pressure is 20 p.s.i.g. (room temperature). The cylinder is cooled to 0° and the volatiles are passed into 200 ml. 10% sodium hydroxide (0°). The contents of the cylinder are combined with 50 g. cracked ice. The combined aqueous layers (pH 11) are steam-distilled. From 600 ml. steam-distillate, about 7.2 g. of an oil layer, $n_D^{25}$ 1.3644 is collected. The product consists of two components: $CF_2ClCF_2CH_2Cl$ and $CCl_2FCF_2CH_2Cl$ separated by preparative VPC.

(b) Preparation of $CF_3CF_2CH_2Cl$

A mixture containing 3.87 g. $CCl_2FCF_2CH_2Cl$ (45%) and $CF_2ClCF_2CH_2Cl$ (51%) and aluminum chloride (0.45 g.) are stirred at room temperature for 15 hours and at 60–65° C. for 4.5 hours. The reaction product is cooled to 0° and 25 g. water (0° C.) is added. The organic layer is separated and found to contain $$CF_3CF_2CH_2Cl$$

by vapor phase chromatography. The presence of $$CF_3CF_2CH_2Cl$$

is confirmed by spiking the product with an authentic sample of $CF_3CF_2CH_2Cl$.

EXAMPLE 2.—$CF_3CF_2CH_2Br$

Following the procedure of Example 1, but substituting an equivalent amount of $CBr_3CF_2CH_2Br$ for the $CCl_3CF_2CH_2Cl$ in (a), $CF_3CF_2CH_2Br$ is obtained.

The invention may be variously otherwise embodied within the scope of the appended claims.

What is claimed is:
1. A process for preparing a compound of the formula $CF_3CF_2CH_2X$, wherein X is selected from the group consisting of chlorine and bromine, which comprises treating a compound of the formula $CFXYCF_2CH_2X$, wherein Y is any halogen and X is as hereinbefore defined, at a temperature of about 0° C. to about 100° C., with a catalyst selected from the group consisting of aluminum chloride, aluminum bromide, aluminum fluoride, boron trifluoride, the etherate of boron trifluoride, ferric chloride, ferric bromide, antimony trichloride, antimony pentachloride, tin tetrachloride, titanium tetrachloride and zinc chloride.

2. The process of claim 1 wherein the halogenated hydrocarbon is a mixture of $CFCl_2CF_2CH_2Cl$ and $$CClF_2CF_2CH_2Cl$$

3. The process of claim 2 wherein the catalyst is aluminum chloride.

References Cited

UNITED STATES PATENTS 2,478,932    8/1949    Miller et al. _____ 260—653
2,598,411    5/1952    Miller et al.

DANIEL D. HORWITZ, *Primary Examiner.*